United States Patent [19]

Froutzis

[11] Patent Number: 4,978,097
[45] Date of Patent: Dec. 18, 1990

[54] COMBINATION REMOVABLE SEAT FRAME AND SEAT BELT BAR

[76] Inventor: Andrew Froutzis, P.O. Box 4110, Elkhart, Ind. 46514

[21] Appl. No.: 407,625

[22] Filed: Sep. 15, 1989

[51] Int. Cl.⁵ .............................................. A47B 97/00
[52] U.S. Cl. .................................. 248/503.1; 296/68.1
[58] Field of Search .................... 248/503.1, 503, 500, 248/188.1, 429; 280/801, 804; 296/68.1, 63

[56] References Cited

U.S. PATENT DOCUMENTS

| | | | |
|---|---|---|---|
| 3,204,916 | 9/1965 | Pickles | 248/429 |
| 4,218,074 | 8/1980 | Crawford | 280/801 |
| 4,238,135 | 12/1980 | Sandham | 297/468 |
| 4,595,164 | 6/1986 | Froutzis et al. | 248/503.1 X |
| 4,770,459 | 9/1988 | Nakaiwa et al. | 280/801 X |
| 4,824,174 | 4/1989 | Tokugawa | 296/68.1 X |

*Primary Examiner*—Ramon O. Ramirez
*Attorney, Agent, or Firm*—Thomas J. Dodd

[57] ABSTRACT

An integral seat frame and seat belt bar which is detachably connected to the floor of a vehicle. The front portion of the frame is slidably attached to a floor fastener with the rear portion connected to floor mounted brackets.

2 Claims, 4 Drawing Sheets

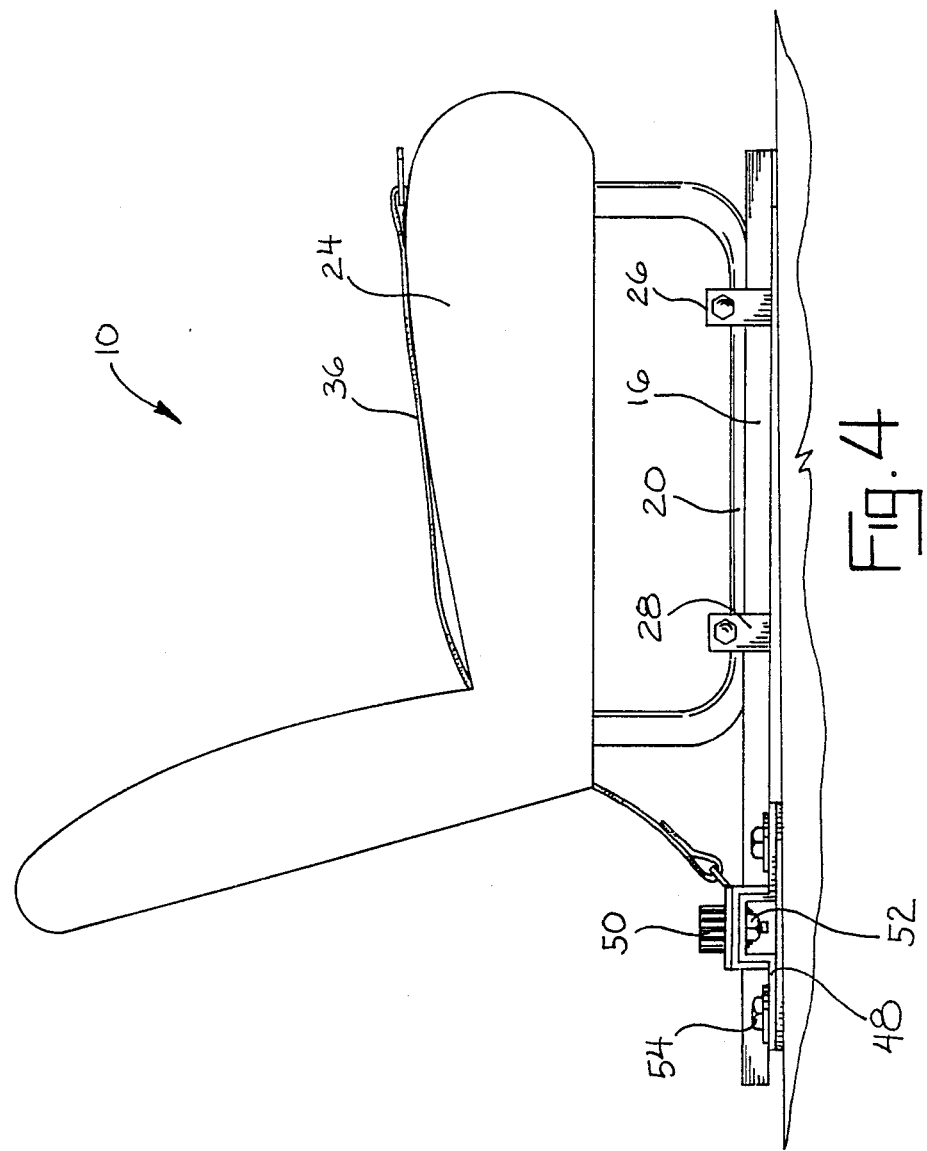

COMBINATION REMOVABLE SEAT FRAME AND SEAT BELT BAR

SUMMARY OF THE INVENTION

This invention relates to vehicle seats and will have application to a seat frame and integral seat belt bar removably mounted to the vehicle floor.

Previously, seat belt bars for vehicle sofas and seats were carried separately of the seat frame, which required an additional step in assembly and disassembly of the sofa or seat.

This invention provides for a seat belt bar which is integrally connected across the seat frame channel members to form a one-piece unit. Fasteners connect the seat frame and seat belt bar to the vehicle floor in a rapidly removable fashion.

Accordingly, it is an object of this invention to provide a seat frame and integral seat belt bar for vehicles.

Another object is to provide a vehicle seat frame and seat belt bar which are rapidly assembled and disassembled.

Other objects of this invention will become apparent upon a reading of the following description.

BRIEF DESCRIPTION OF THE DRAWINGS

A preferred embodiment of the invention has been depicted for illustrative purposes only wherein:

FIG. 4 is a side elevation view of the combination in its assembled form.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Figure 2:
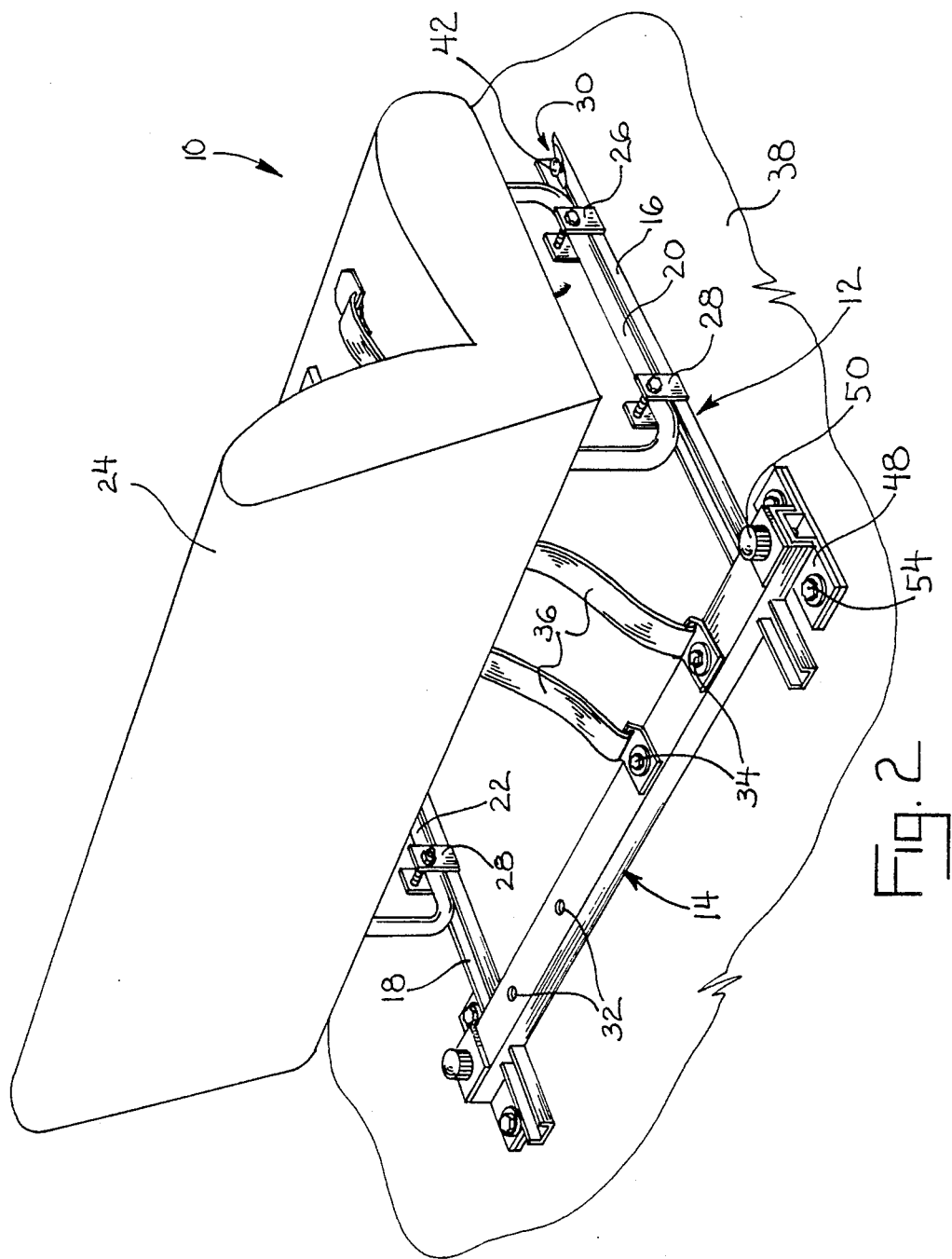
FIG. 2 is a perspective view of the combination shown connected to a vehicle floor.

Referring now to the drawings, reference numeral 10 refers generally to the seat frame 12 and seat belt bar 14 combination of this invention. Seat frame 12 includes two generally parallel oriented U-shaped channel members 16 and 18 which house the lower support rails 20 and 22 of sofa 24. Brackets 26 and 28 secure rails 20, 22 to channel members 16, 18 as shown in FIG. 2. Each channel member 16 and 18 has a slot 30 which terminates at the front edge thereof.

Figure 1:
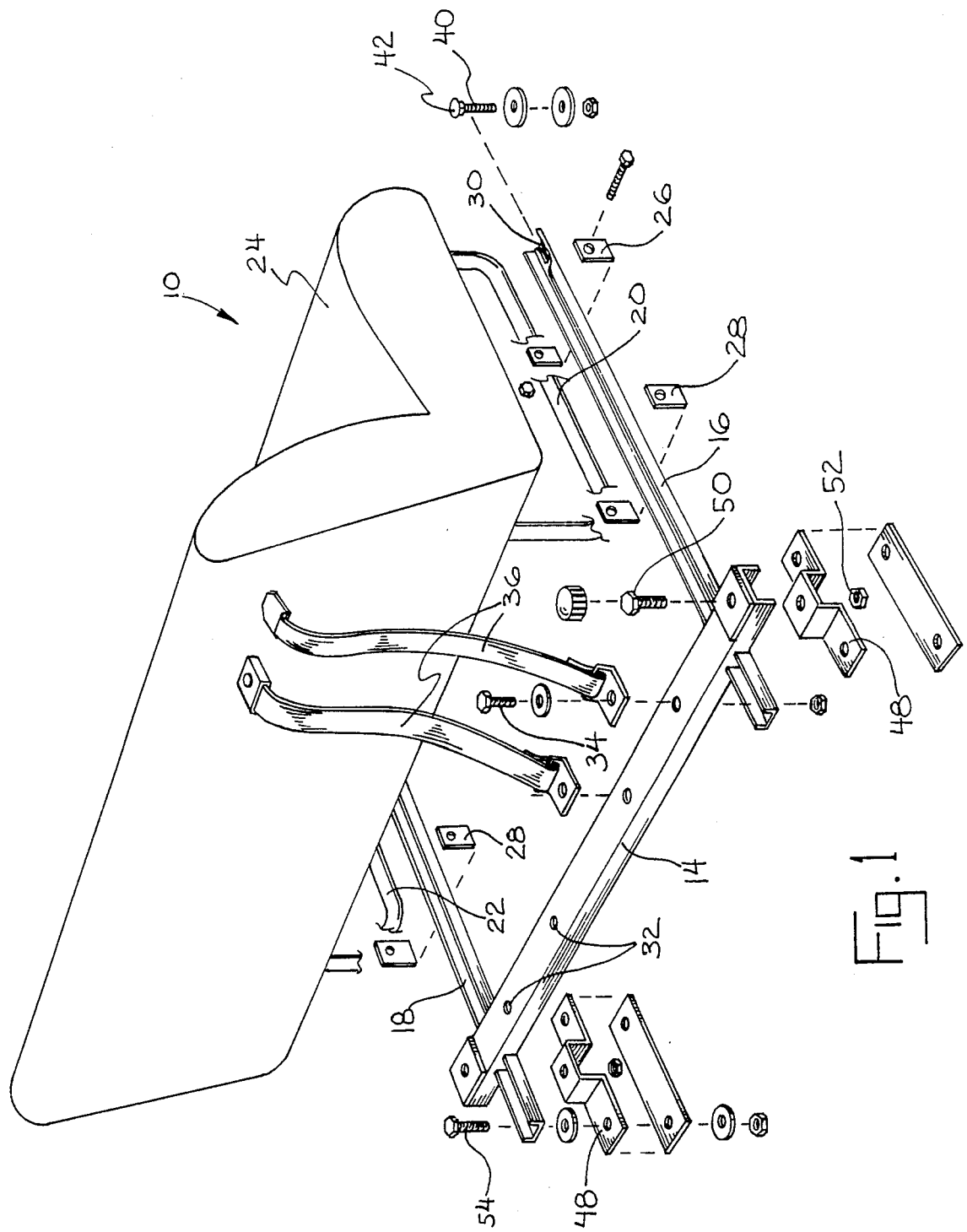
FIG. 1 is an exploded view of the sofa, the seat frame, and seat belt bar of this invention.

Seat belt bar 14 traverses channel members 16 and 18 as shown in FIGS. 1 and 2. Bar 14 is of an inverted U-shape and has a plurality of spaced holes 32 which house studs 34 to which seat belts 36 for sofa 24 are attached. Bar 14 is connected to channel members 16, 18 as by welding to form a single-piece unit.

Figure 3:
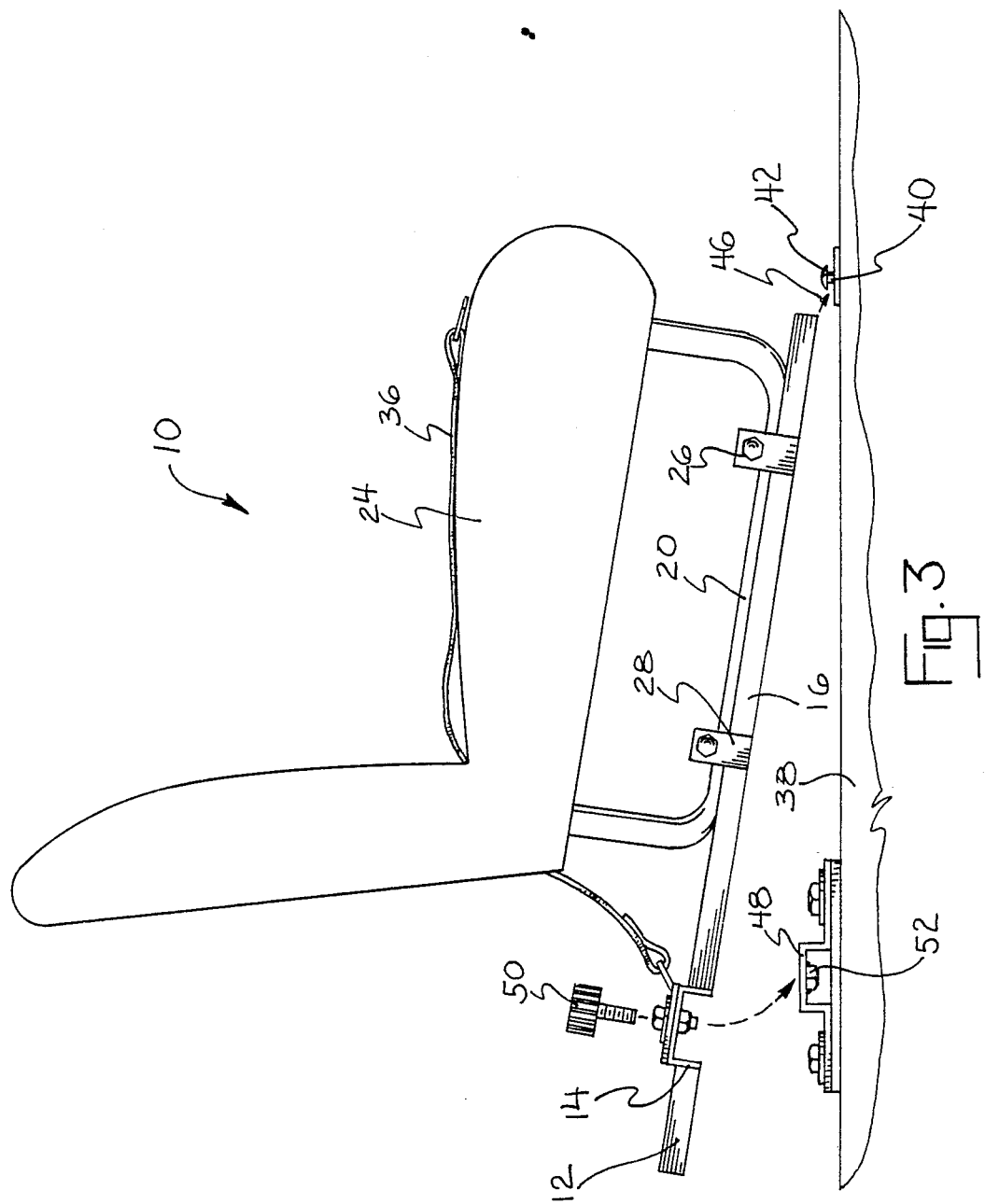
FIG. 3 is a side elevation view of the combination just prior to assembly.

Combination 10 is secured to and removed from vehicle floor 38 as follows. Channel members 16, 18 have their slots 30 aligned with floor mounted fastener 40 which has enlarged head 42 and combination 10 is slid in the direction of arrow 46 (see FIG. 3). Since enlarged head 42 is wider than slot 30, the channel members 16, 18 are now secured against uplifting forces. Seat belt bar 14 is then aligned with mounting brackets 48 and secured to the upraised part of the brackets by hand turnable fasteners 50 and nuts 52. Mounting brackets 48 are secured to floor 38 by fasteners 54. To remove combination 10 for conversion of the vehicle to a storage use, fasteners 50 are removed and the combination slid towards its rear to dislodge slots 30 from fasteners 40. Sofa 24 and combination 10 are then removed as a single piece unit.

It is to be understood that the invention is not limited to the details above given, but may be modified within the scope of the following claims.

I claim:

1. A seat frame adapted for removably carrying a vehicle seat, said seat frame including spaced generally parallel frame channel members, a seat belt bar traversing said channel members and serving to connect the channel members to form a one piece unit fastener means for removably mounting said channel members and seat belt bar to a floor, each channel member has a slot adjacent a front edge thereof, securing means including first fasteners each having an enlarged head, and a shank mounted in a floor with said channel member slidable onto said fastener shank through said slot, said securing means further including second fasteners, said second fasteners constituting means for removably securing a rear edge seat frame and seat belt bar to the floor.

2. The seat frame of claim 1 wherein said securing means further includes a mounting bracket fixed to said floor adjacent said channel member rear edge, said mounting bracket including a central raised portion and integral spaced tabs, a third fastener extending through said seat belt bar and said mounting bracket raised portion to secure the seat frame and seat belt bar to the mounting bracket, said second fasteners extending through said integral tabs and into said floor to secure the seat frame and seat belt bar to the floor.

* * * * *